Figure 1:
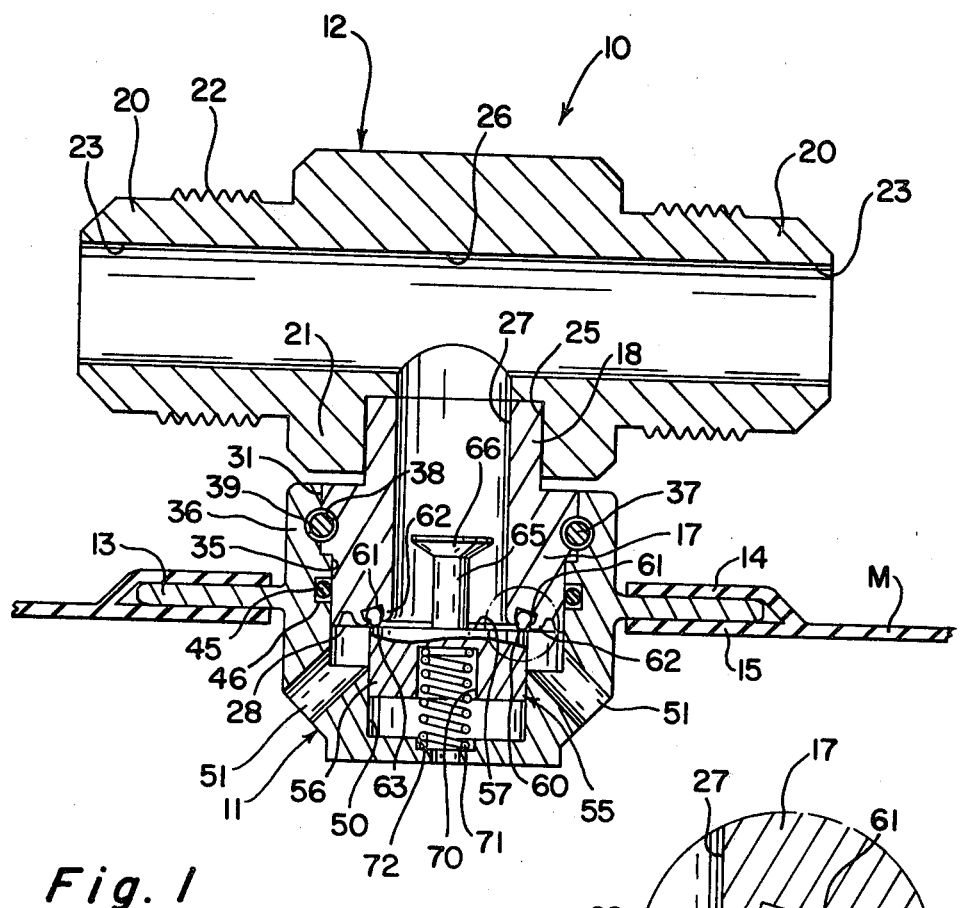
Figure 2:
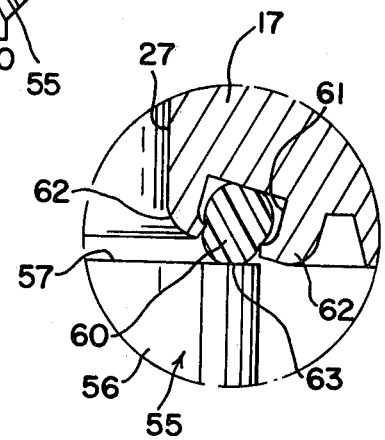

United States Patent [19]

Seabase et al.

[11] 4,413,645
[45] Nov. 8, 1983

[54] FLUID SWIVEL VALVE DEVICE

[75] Inventors: Peter P. Seabase, Cuyahoga Falls; Rickard N. Crewes, Uniontown, both of Ohio

[73] Assignee: National Machine Company, Inc., Stow, Ohio

[21] Appl. No.: 219,917

[22] Filed: Dec. 24, 1980

[51] Int. Cl.³ .............................................. F16K 15/20
[52] U.S. Cl. .................................... 137/223; 137/536; 137/540; 137/798; 251/120; 441/41
[58] Field of Search ........................ 9/2 A, 11 A, 319; 137/223, 516.29, 536, 540, 580, 798; 251/120, 121, 152; 441/41

[56] References Cited

U.S. PATENT DOCUMENTS

| 182,015 | 9/1876 | Blake | 251/120 |
|---|---|---|---|
| 2,353,161 | 7/1944 | Heigis | 9/319 X |
| 2,608,376 | 8/1952 | Adams | 137/516.29 |
| 2,969,085 | 1/1961 | Nystrom | 251/120 X |
| 3,142,850 | 8/1964 | De Boer | 441/41 |
| 3,770,008 | 11/1973 | Turney | 137/540 X |

FOREIGN PATENT DOCUMENTS 1142008  2/1969  United Kingdom ................ 137/223

OTHER PUBLICATIONS

Bell Helicopter Drawing No. 214-052-019; Apr. 23, 1979.

Primary Examiner—Robert G. Nilson
Attorney, Agent, or Firm—Hamilton, Renner & Kenner

[57] ABSTRACT

A swivel valve assembly (10) for an inflatable member (M) permitting passage of a high velocity input of fluid from a pressurized source and providing sealing closure upon pressure equalization including a body (11,12) having a connector (13) for sealing engagement with the inflatable member, a bore (27) in the body communicating with the pressurized source of fluid, a passage (51) in said body communicating with the inflatable member and connecting with the bore, and a movable poppet (55) operative with a sealing member (60) for precluding fluid flow upon pressure equalization and having a disk (66) positioned in the bore for throttling the high velocity input of fluid before passing the sealing member.

7 Claims, 2 Drawing Figures

FLUID SWIVEL VALVE DEVICE

TECHNICAL FIELD

The present invention relates generally to a valve assembly used for controlling the ingress of fluid to an inflatable member. More particularly, the present invention relates to a swivel valve assembly which permits the controlled discharge of a high velocity input of fluid from a pressurized source to an inflatable member and provides sealing closure of the inflatable member upon pressure equalization between the pressurized source and the inflatable member. More specifically, the invention relates to a swivel valve assembly which may pivot as necessary during or subsequent to the introduction of high velocity fluid from a pressurized source to an attached inflatable member such as a flotation bag and sealingly closes the inflatable member once the pressure in the pressurized source and the inflatable member are equalized.

BACKGROUND ART

Over the years various types of fittings have been developed for use in conjunction with inflatable members such as flotation bags for helicopters. In general, it is necessary that a fluid be delivered from a high pressure, small volume source to the inflatable member on a selected basis when the system is energized. In order to provide rapid uniform inflation of such inflatable members it is common to provide a plurality of fittings on each inflatable member to permit the simultaneous introduction of fluid such as a compressed gas to a number of different areas within the inflatable member. In order to effect such distribution of fluid input through various fittings, one fitting is commonly connected to the pressurized fluid source by a conduit and additional conduits interconnect to the other fittings. Since the configuration of the inflatable member normally changes drastically from an uninflated stored configuration to the inflated operating condition, it is necessary to provide for movement of the position or orientation of the conduits or hoses as by providing swivel elements on the fittings to accommodate random repositioning of the conduits. Since the conduits may be and normally are left in position after the inflation, the possibility of further conduit or hose movements relative to the inflatable member must also be provided for to avoid undue stresses which could be deleterious to the combined fabric and elastomeric make up of such inflatable members.

Swivels of this type have normally been constructed of stainless steel or brass to accommodate high operating pressures over a brief time and corrosion resistance in a salt water environment despite cost and weight disadvantages they provide in an aircraft environment. The prior art devices have generally employed a type of poppet valve as the primary operating component of the fittings. In order to provide an effective seal after inflation, the poppet valves are commonly provided with a molded elastomeric surface to achieve an effective seal. Normally elastomers which can be molded on a valve surface have limited resistance to the distortions and pitting which can be produced by the passage of high velocity fluid.

The throttling effect produced by conventional fittings is normally predicated upon the size of a plurality of passages positioned between the poppet valve and the inflatable member. Depending upon the interconnection and spacing between the various fittings and the pressurized source of fluid it is normally necessary to have available a plurality of different fittings having different sized passages to achieve a system balance which accommodates a division of the fluid from the pressurized source to the various fittings. In employing fittings of this nature, the necessity for varying system balance, e.g., to use different pressurized fluid sources, normally requires replacement of the entire fitting. To applicant's knowledge one or more of the above outlined disadvantageous structural or operational features have accompanied prior art devices of this type.

DISCLOSURE OF THE INVENTION

Therefore, an object of the present invention is to provide a swivel valve assembly which can be installed and replaced in flotation bags with a minimum of difficulty and without damage to the flotation bag. Another object of the invention is to provide an inflation system made up of a plurality of such swivel valve assemblies which may be readily balanced or tuned to accommodate differing spatial relationships and interconnections of the valves and pressure source therefor by disassembly of the valve and substitution of a different size poppet element. A further object of the invention is to provide swivel valve assemblies in which the swivel seal is subjected to only low pressure fluid, thereby permitting free and easy swivel action to eliminate twisting of hoses connected to the swivel during deployment and to avoid imparting stresses to the inflatable members during changes in configuration and related movements.

Another object of the invention is to provide a swivel valve assembly which effects improved low pressure sealing by virtue of the usage of a standard configuration sealing element constructed of an optimum material to withstand attendant temperature and pressure conditions while effecting optimum sealing engagement. Yet another object of the invention is to provide a valve having a disk positioned in a bore to create a precise annular fluid throttling orifice for accurate fluid flow characteristics. Still another object of the invention is to provide such a valve in which only a limited portion of the valve interior is exposed to the high pressure discharge from the pressurized source released during deployment of the inflatable member.

Another object of the invention is to provide a swivel valve assembly which may be disassembled by removal of a single retaining ring. Yet another object of the invention is to provide such a valve wherein the sealing member is positioned to encounter only low pressure fluid flow forces and is not subjected to the high pressure fluid discharged from the pressurized source. A still further object of the invention is to provide a swivel valve assembly of this type which is constructed of a minimum of parts, which may also be constructed of lightweight material such as aluminum and which is capable of operating through repeated deployment sequences without affecting the operation of the seal or other valve components.

In general, a swivel valve assembly, according to the concepts of the present invention, for an inflatable member permitting passage of a high velocity input of fluid from a pressurized source and providing sealing closure upon pressure equalization includes a body having a connector for sealing engagement with the inflatable member, a bore in the body communicating with provide an exposed sealing surface 63 while protecting and insuring retention of the O-ring 60.

The poppet element 55 has a projecting neck 65 extending beyond the seating surface 57 which connects to a radially projecting disk 66. The disk 66 forms with the valve bore 27 an annular throttling orifice which as is hereinafter explained, effects the predominant throttling of the fluid passing through the valve assembly 10.

The axial extremity of poppet element 55 opposite the disk 66 has a cylindrical bore 70 which houses a compression spring 71 that seats in a shallow bore 72 in the extremity of cylindrical recess 50 of fixed body member 11. The spring 71 is substantially totally housed within the bore 70 when the poppet element 55 moves downwardly in the cylindrical recess 50 to seat against the lower extremity of the cylindrical recess 50.

In operation when the inflatable member M is maintained in its normal stowage position the valve assembly 10 and inflatable member M are totally without internal pressurizing fluid. The valve assembly 10 has its elements reposing in the positions depicted in the drawing. The spring 71 in the absence of opposing pressure maintains the poppet element 55 positioned as depicted in the drawing with the O-ring 60 engaging the seating surface 57 of the poppet 55.

When the inflatable member M is to be deployed, pressure is released at the source of pressurized fluid which may typically be a tank of gas stored at approximately 3,000 p.s.i. The high pressure fluid flows at high velocities to the valve assembly 10 and is introduced through entry bore 26 and valve bore 27. The influx of high pressure fluid drives the poppet element 55 fully into the cylindrical recess 50 by overcoming the compression spring 71. The high pressure fluid thus flows by the disk 66 and is appropriately throttled at the annular orifice between disk 66 and valve bore 27. The displacement of the poppet element 55 moves the seating surface 57 away from the O-ring 60 such that inflating fluid is permitted to flow therebetween and out through the outlet passages 51. It is advantageous that portions of the valve assembly 10 are of such a relation that a greater cross-sectional area than exists at the disk 66 is provided proximate the seating surface 57 and through the outlet passages 51 during fluid flow, such that the predominant throttling action takes place in the annular throttling orifice.

Once the pressurizing fluid is rapidly converted from a small volume high pressure source to a large volume filling the inflatable member M at a pressure of approximately 3–5 p.s.i., the valve assembly 10 then provides low pressure sealing once this pressure is reached. This is accomplished by the spring 71 operating to displace the poppet element 55 such that O-ring 60 seats against seating surface 57 as shown in the drawing figure.

The rapid decompression attendant the filling of inflatable member M tends to create an extremely cold gas passing the O-ring 60 which is capable of at least instantaneously freezing the O-ring 60. Although a cold or frozen seal is less susceptible to erosion or pitting damage, it is also significant that O-ring 60 be constructed of a material which resists low temperature deterioration and is sufficiently resilient at low temperatures to effect the requisite sealing operation. It has been determined that an appropriate material for the O-ring 60 is an EPDM or other synthetic rubber and preferably a fluoroelastomer such as VITON (a registered trademark of E. I. DuPont de Nemours & Co.). In lieu of the swaged projecting lips 62, the O-ring 60 may be bonded in the groove 58 by an appropriate bonding agent dependent upon the material used. A cyanoacrylate bonding agent may be employed in conjunction with VITON or similar materials. It is also to be noted that the disposition of the groove 61 which seats O-ring 60 with respect to the fluid flow is in an area of lower velocity without direct gas impingement. It is also to be noted that the seal 45 in groove 46 is exposed only to the low pressure gases from the outlet passages 51 which have passed through the throttling area at disk 66 such that seal 45 is not exposed to the high pressure fluid introduced to valve assembly 10. It is to be appreciated that the distribution of the fluid among various valve assemblies 10 may also be controlled by having a plurality of sizes of poppet elements 55 and particularly with variations in the radial extent of disk 66 such as to selectively vary the throttling characteristics through the throttling orifice. This may be accomplished while maintaining the relative sizes and flow characteristics hereinabove set forth.

Thus, it should be evident that the valve assembly described herein carries out the various objects of the invention set forth hereinabove and otherwise constitutes an advantageous contribution to the art. As may be apparent to persons skilled in the art, modifications in the size of the valve element, the sealing member materials and other alterations could be employed without departing from the spirit of the invention, the scope of the invention being limited solely by the scope of the attached claims.

I claim:

1. In a swivel valve assembly for an inflatable member permitting passage of a high pressure and velocity input of fluid from a pressurized source and providing sealing closure upon pressure equalization, the valve assembly comprising, body means having connecting means for sealing engagement with the inflatable member, cylindrical bore means in said body means communicating with the pressurized source of fluid, cylindrical recess means of greater diameter than and communicating with said bore means, passage means in said body means communicating with the inflatable member and connecting with said cylindrical recess means, and poppet means movable within said bore means and said cylindrical recess means, having a seating surface extending radially outwardly of said bore means to engage a sealing member in said body means for precluding fluid flow upon pressure equalization, and having a disk positioned in said cylindrical bore means for providing preselected throttling of the high velocity input of fluid before passing said sealing member.

2. A valve assembly according to claim 1, wherein said disk is positioned on a projecting neck of said poppet means and forms with said bore means an annular fluid throttling orifice.

3. A valve assembly according to claim 1, wherein said sealing member is positioned in a groove located in said body means.

4. A valve assembly according to claim 3, wherein said sealing member is an O-ring with said groove having projecting lips being swaged about said O-ring to provide an exposed sealing surface while protecting and retaining said O-ring.

5. A valve assembly according to claim 1, wherein spring means interposed between said body means and said poppet means biases said poppet means so that an O-ring seals against said seating surface to close said recess means upon pressure equalization.

6. A swivel valve assembly for an inflatable member permitting passage of a high pressure and velocity input of fluid from a pressurized source and providing sealing closure upon pressure equalization comprising, body means having connecting means for sealing engagement with the inflatable member, bore means in said body means communicating with the pressurized source of fluid, passage means in said body means communicating with the inflatable member and connecting with said bore means, and movable poppet means operating with a sealing member for precluding fluid flow upon pressure equalization and having a disk positioned in said bore means for throttling the high velocity input of fluid before passing said sealing member, said body means having a fixed body member attachable to the inflatable member and including a sleeve portion and having a movable body member with a projecting shaft which freely rotatably interfits with said sleeve portion of said fixed body member, said shaft and said sleeve having mating grooves for receiving a retainer ring selectively preventing axial separation of said movable body member and said fixed body member and having interposed sealing means exposed only to low pressure fluid.

7. A valve assembly according to claim 6, wherein said fixed body member has an integral radially projecting flange for attachment to the inflatable member.

* * * * *